(12) United States Patent
Liu et al.

(10) Patent No.: US 7,403,206 B1
(45) Date of Patent: **\*Jul. 22, 2008**

(54) PICKING TV SAFE COLORS

(75) Inventors: Min Liu, Redmond, WA (US); Regis J. Crinon, Camas, WA (US); Jason S. White, Seattle, WA (US); Charles Finkelstein, Woodinville, WA (US); Michael D Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 301 days.

This patent is subject to a terminal disclaimer.

(21) Appl. No.: 11/031,364

(22) Filed: Jan. 7, 2005

Related U.S. Application Data

(62) Division of application No. 10/676,317, filed on Oct. 1, 2003, now abandoned.

(51) Int. Cl.
*G09G 5/02* (2006.01)

(52) U.S. Cl. .................. 345/594; 345/589; 345/593; 345/604; 715/823; 715/824

(58) Field of Classification Search ............. 345/594; 715/823, 824; 348/179, 577
See application file for complete search history.

(56) References Cited

U.S. PATENT DOCUMENTS

| | | | |
|---|---|---|---|
| 4,707,727 A * | 11/1987 | Penney | 348/184 |
| H1506 H | 12/1995 | Beretta | |
| 5,500,921 A | 3/1996 | Ruetz | |
| 5,502,458 A | 3/1996 | Braudaway et al. | |
| 6,313,824 B1 * | 11/2001 | Meisner et al. | 345/589 |
| 6,335,734 B1 | 1/2002 | Nagae et al. | |
| 6,453,459 B1 * | 9/2002 | Brodersen et al. | 717/100 |
| 6,466,274 B1 | 10/2002 | White | |
| 6,650,337 B2 | 11/2003 | Stradley et al. | |
| 6,828,981 B2 | 12/2004 | Richardson | |
| 6,944,334 B2 | 9/2005 | Piatt et al. | |
| 2003/0174882 A1 | 9/2003 | Turpin et al. | |
| 2004/0051888 A1 | 3/2004 | Zolliker | |
| 2005/0024384 A1 | 2/2005 | Evans et al. | |

OTHER PUBLICATIONS

"Easy RGB—The first RGB and Color search engine on the Web!" http://web.archive.org/web/20001109030200/http://www.easyrgb.com/ Copyright (c) 2000 Logicol S.r.l. Date created: Nov. 9, 2000. Date accessed: Dec. 14, 2006.*

"Internet Archive Wayback Machine"—http://web.archive.org/web/*/http://www.easyrgb.com. Date accessed Dec. 14, 2006.*

(Continued)

*Primary Examiner*—Kee M. Tung
*Assistant Examiner*—Antonio A Caschera

(57) ABSTRACT

Validating a color that is selected in an authoring environment for display in a destination media environment includes selecting a color for an application, converting the values of the color to those in a fundamental color space, and converting the values from the fundamental color space to those in a color space corresponding to the destination media environment. Validity of the selected color in the destination media environment depends on the component values in the destination media environment being within an acceptable range of values.

19 Claims, 7 Drawing Sheets
(1 of 7 Drawing Sheet(s) Filed in Color)

OTHER PUBLICATIONS

"WebTV Rev ColorPicker." Screenshots 1-3 created via http://sepwww.stanford.edu/sep/jon/family/jos/webtv/RevisedColorpick2/index.html. First published on the web on May 28, 2003. Accessed via web on Nov. 19, 2007.*

"EasyRGB-Match your RGB and Color Data with Paint, Inks, Color Cards and More.-Color Matching", Available at http://www.easyrgb.com/matching.php. Copyright (c) 2000-2006 Logicol S.r.l Date Accessed: Aug. 21, 2006.

"Easy RGB—the first RGB and Color seach engine on the Web!", http://web.archive.org/web/20001109030200/http://www.easyrgb.com/ Copyright (c) 2000 Logicol S.r.l. Date created: Nov. 9, 2000. Date accessed: Dec. 14, 2006., 3-11.

"EasyRGB—Match your RGB and color data with paint, inks, color cards and more.—Color Matching.", http://www.easyrgb.com/matching.php. Copyright (c) 2000-2006 Logicol S.r.l. Date accessed: Mar. 27, 2007., 1-7.

"Internet Archive Wayback Machine", http://web.archive.org/web/*/http://www.easyrgb.com. Date accessed Dec. 14, 2006., 1-5.

* cited by examiner

PICKING TV SAFE COLORS

CROSS REFERENCE TO RELATED APPLICATIONS

This application is a divisional of, and claims priority to U.S. patent application Ser. No. 10/676,317, entitled "Picking TV Safe Colors" to Liu, et al., filed Oct. 1, 2003 now abandoned, the disclosure of which is incorporated by reference herein.

FIELD

The present invention relates to the design and programming of TV applications and content in a full-featured authoring environment.

BACKGROUND

Seamless sharing of color information, including the dispensation and receiving thereof, from one medium to another is stymied by the lack of one comprehensive color format. Thus colors look different on different display mediums as a result of being produced and processed in different environments, such as computer graphics (including web design and gaming technologies), television broadcasting, desktop publishing, photocopying, etc., that continue to utilize different standards, terminology, and methods for communicating color information.

For example, there has been no merger of the multiple standard and non-standard RGB monitor spaces into a single standard RGB color space (RGB denotes "Red Green Blue," which is the color model used for generating video on a display screen using varying intensities of red, green and blue dots). As a result, media that purport to utilize RGB color standards utilize RGB standards and communication methodologies that are often incompatible with RGB standards utilized by other media.

Further, computer monitors use an RGB color space and televisions use a YIQ color space in North America and Japan, or a YUV color space in Europe, which is a transformed version of the RGB color space. Thus, it is not uncommon for a video game application designed and programmed on a content source computer in an RGB color space to require some colors that cannot be displayed on a gaming console such as a television (TV), or alternatively to require some colors that have a different appearance in the YIQ color space than in the RGB color space. That is, colors from the authoring environment color space do not always map properly to a destination color space.

SUMMARY

Picking TV safe colors is described herein.

According to one aspect, validating a color that is selected in an authoring environment for display in a destination media environment includes normalizing the component values of the color selected in the color space corresponding to the authoring environment, converting the normalized component values to corresponding component values in a reference color space, and converting the components values corresponding to the reference color space to corresponding component values in the color space of the destination media environment. Validity of the selected color in the destination media environment depends on the component values in the destination media environment being within an acceptable range of values.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description, while indicating example embodiments, is only illustrative since various changes and modifications will become apparent to those skilled in the art from the following detailed description, in which.

DETAILED DESCRIPTION

Figure 1:
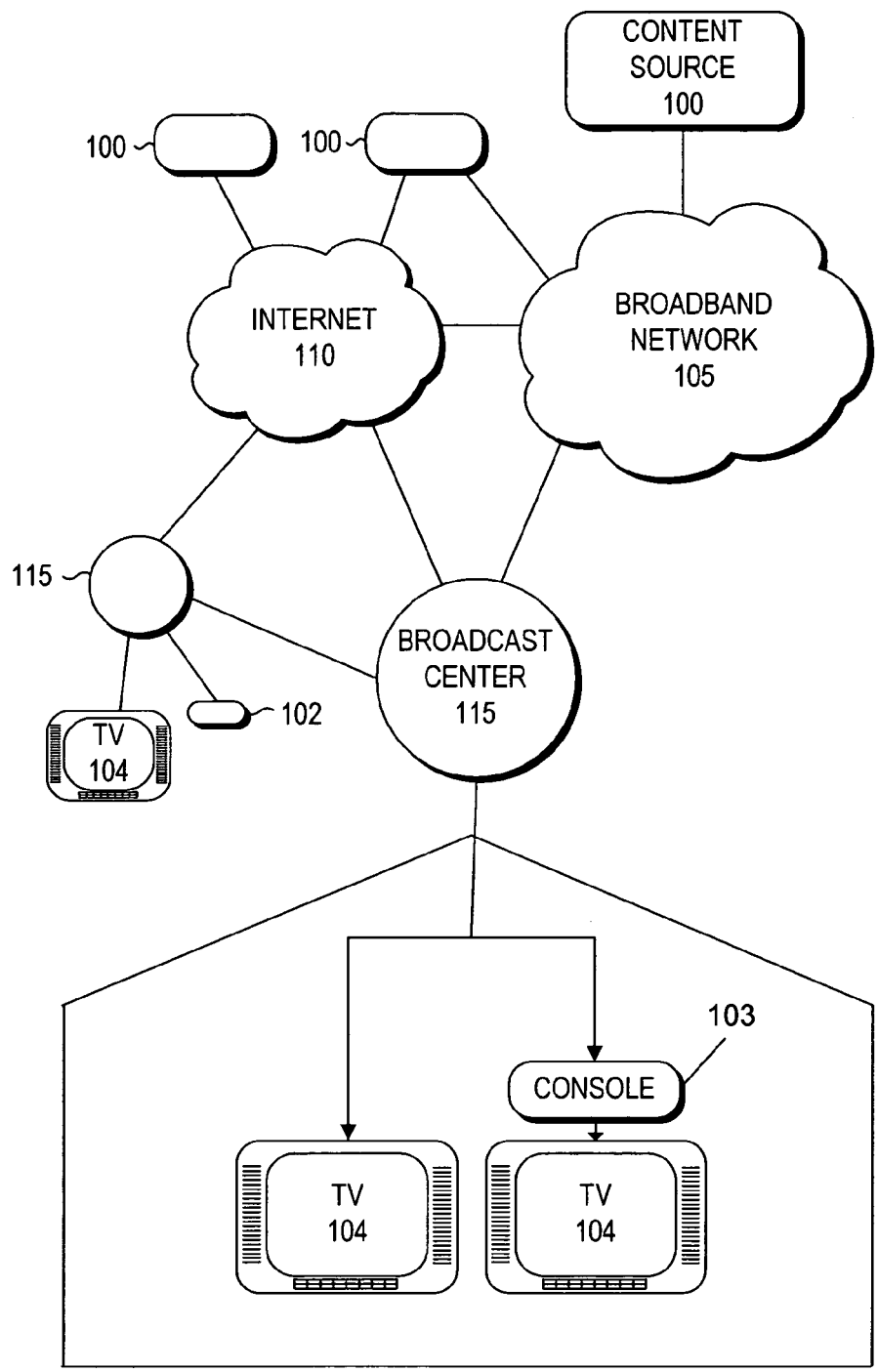
FIG. 1 shows a client/network system in accordance with example embodiments.

FIG. 1 shows a system for distributing media signals to subscribers, whereby one or more content sources 100 are linked to plural televisions (TVs) 104, either directly or via video gaming console 103 or set top box (STB) 102, by broadband network 105.

Broadband network 105 includes, e.g., a cable television (CATV) network or a direct broadcast satellite (DBS) network. Broadcast centers 115 are referred to as "head-ends," which are centrally-located facilities within a respective community in which TV programming is received from, e.g., a local cable TV satellite downlink and packaged for transmission to subscriber homes. Broadcast centers 115 may be directly coupled to one another or connected through broadband network 105. In some cases, broadcast centers 115 may be connected through other networks, a particular example of which is the Internet 110. Communication over the Internet 110 is accomplished using TCP/IP (Transmission Control Protocol/Internet Protocol) and other standard protocols.

In the subscriber's destination environment, STB 102 receives media signals from at least one of content sources 100 via broadband network 105, and displays such signals on television (TV) 104 or similar display device. STB 102 is located on, or in close proximity to, TV 104. Alternatively, TV 104 may have STB-like capabilities integrated therein. Further, although current implementations include a one-to-one correspondence between TV 104 and either one of video gaming console 103 and STB 102 in order to receive and display media signals, efforts are ongoing to have a single, comprehensive STB 102 provide media signals for multiple units of TV 104 in one subscriber's destination environment. Such comprehensive STB 102 may also include all capabilities of video gaming console 103. All of the foregoing configurations of TV 104, STB 102, and video gaming console 103 are to be contemplated in accordance with destination environments referenced herein.

A system for distributing media signals to subscribers includes one or more content sources 100 linked to plural STBs 102, video gaming consoles 103, and/or TVs 104 by broadband network 105 or another appropriate connection.

As used herein, the terms "media signals," "media content," and "content" are broadly construed to include video and/or audio content, pictures, animations, text, etc. that are included in the applications and software programs that are designed and programmed at any of content sources 100 and transmitted to at least one of STBs 102, video gaming consoles 103, and TVs 104 in a destination environment. As such, content sources 100 may correspond to video game servers, websites, video servers, music servers, software archives, databases, television networks, etc.

Figure 2:
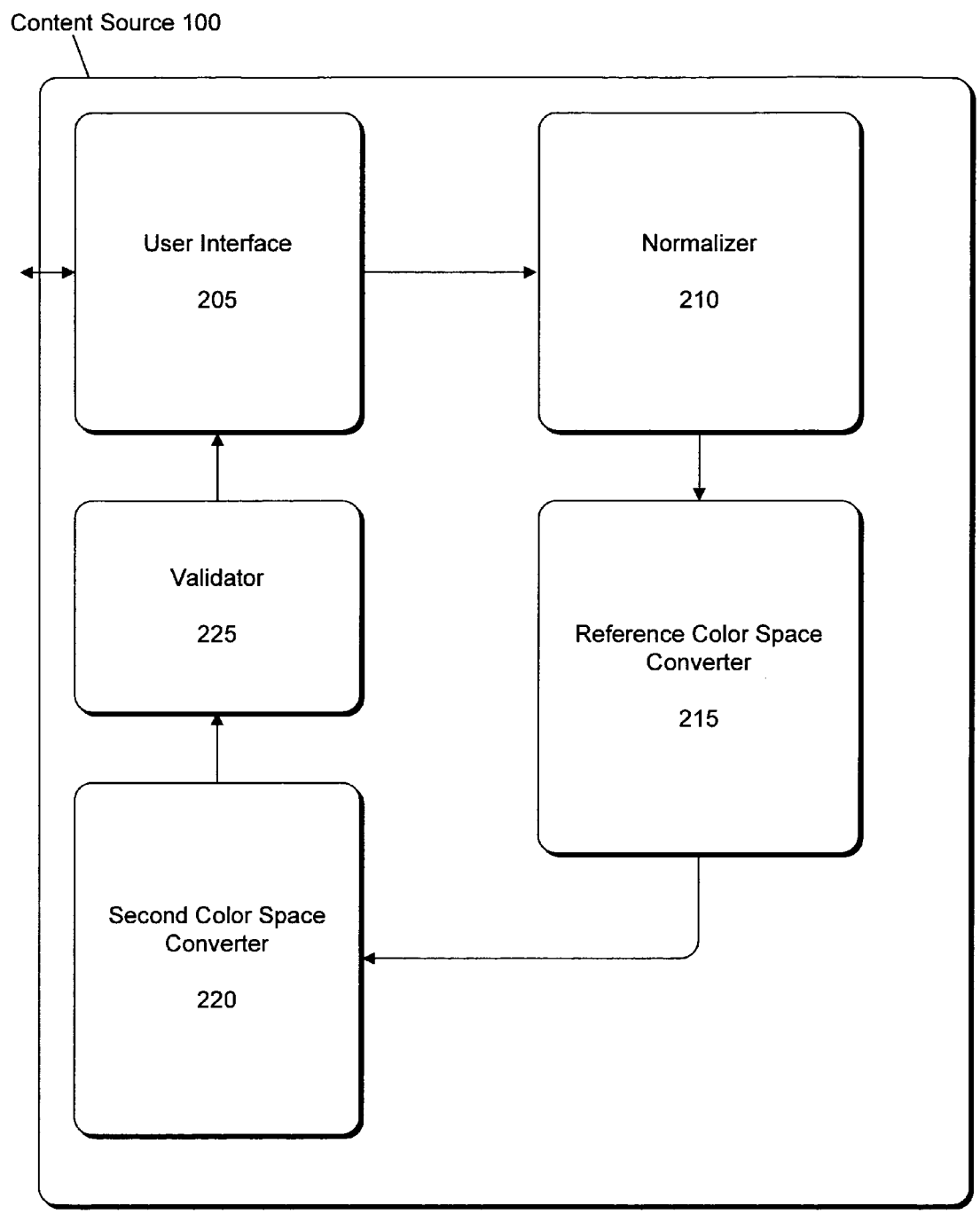
FIG. 2 shows a block diagram illustrating the processing for a feature according to an example embodiment.

Content source 100, shown in the block diagram of FIG. 2, serves as a reference system for the example embodiments of processing described herein. Content source 100 is an authoring environment of TV applications. The designing and programming of such applications are to employ colors that are valid for use on TV 104 and therefore safe for use by STB 102 and video gaming console 103 as well. The validity of such colors depends upon the TV standard of the destination environment. That is, the content of the applications created at content source 100 should be TV-safe. Accordingly, it may be expected that multiple versions of one TV application would be designed and programmed in order to accommodate multiple TV standards.

Computer monitors, such as those utilized at content source 100, utilize the RGB color space. RGB is "Red Green Blue," which can include, but is not limited to, an sRGB color space. sRGB denotes the "standard default RGB" color space developed jointly by the Hewlett-Packard® Corporation and the Microsoft® Corporation. The sRGB color space is based on the monitor characteristics expected in a dimly lit office. It has been standardized by the International Electrotechnical Commission (IEC) as IEC 61966-2-1.

For at least example embodiments described herein, the destination color spaces corresponding to platforms for, at least, STBs 102, video gaming consoles 103, and monitors for TVs 104 include: the YIQ color space, which is the color model used for encoding NTSC (National TV Standards Committee) video; the YUV color space, which is the color model used for encoding; PAL (Phase Alternate Line or Phase Alternation Line) video, which is the standard for color television broadcast throughout much of Europe; and SECAM ("Sequential Couleurs á Memoire" or "Systeme Electronique Couleur Avec Memoire") video, which is the television broadcast standard used in France, the Middle East, and most of Eastern Europe.

In addition, a destination media environment, according to the example embodiments described herein, is not limited to a television environment. Platforms for STBs 102, video gaming console 103, or color spaces for TVs 104 may refer to special purpose display devices having color spaces or gamuts that are different from conventional television or video monitors and therefore require specialized video signal formats. Examples of such special purpose video displays include piloting monitors that are installed in aviation cockpits, nautical bridges, and testing simulators for both.

Further still, with the advent of TV-based web-programming and computer-based television, content source 100 may also include any of the color spaces described above corresponding to platforms for STBs 102, video gaming consoles 103, and display device(s) 104, and that the destination environment would include an RGB or sRGB color space.

The example embodiment of content source 100 in FIG. 2 includes user interface (UI) 205 to detect or receive a color selection from a user, most likely a designer or programmer, who is creating applications for a destination TV environment. Normalizer 210 is to normalize the component values of the selected color in accordance with the number of bits-per-channel encoding chosen for representing each color in the corresponding color space. Converter 215 is to convert the normalized component values into a reference color space, which is standardized by the IEC. Second color space converter 220 is to convert the component values corresponding to the reference color space to component values corresponding to the destination media environment. If the converted component values are determined to be within acceptable parameters by validator 225, the color is deemed to be "TV safe," and therefore may be included in the application. UI 205 provides the user with an indication of the determined validity or invalidity of the selected color for a destination TV environment. An indication of validity may include a rendering of the color in at least one of the authoring environment and the destination environment, whereas an indication of invalidity may include requesting the user to select another color.

Figure 3:
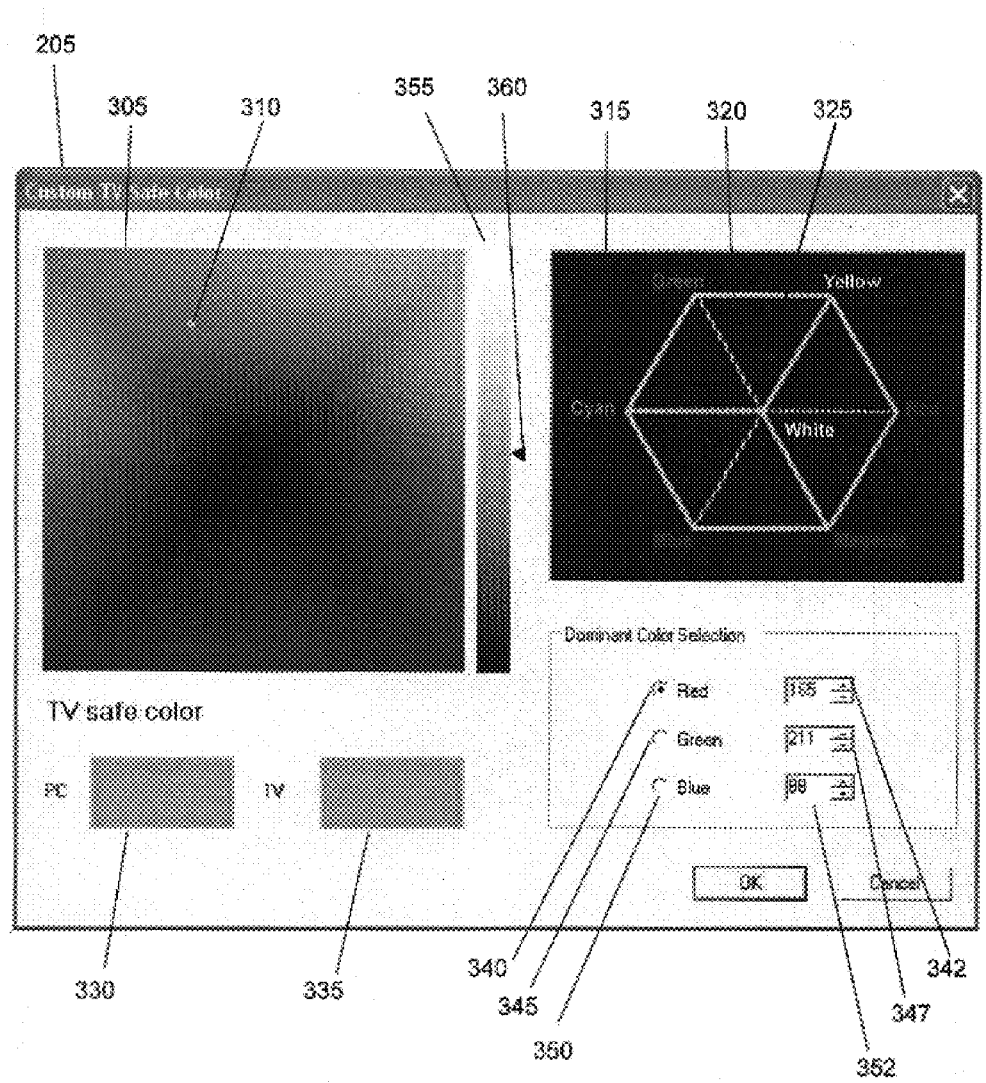
FIG. 3 shows an example interface that may be used in conjunction with the example embodiments described herein.

FIG. 3 shows an example embodiment of UI 205. UI 205 includes color palette 305 and rendering 315, both corresponding to the color space of the authoring environment, which is an 8-bit RGB/sRGB color space, according to the present example. As is known in the art, components of an 8-bit RGB/sRGB thus have the range of values [0,255], with black at code (0, 0, 0) and white at code (255, 255, 255).

In the example embodiment of FIG. 3, rendering 315 depicts a three-dimensional (3-D) cube 320 corresponding to the RGB color space. More particularly, since it is difficult to present a 3-D cube 320 in a two-dimensional (2-D) space so that the user can select a desired color, a 2-D section of the 3-D rendering 315 is provided in the form of palette 305. Palette 305 is a 2-D slice of the 3-D space, based on a "Dominant Color Selection." Alternative embodiments may include rendering 315 in a hexagon or even double-hexagon shape, whereby palette 305 includes a rotatable 3-D depiction of the color space for better viewing.

More particularly, palette 305 is a 2-D slice of the 3-D space, based on a "Dominant Color Selection" from among "Red" 340, "Green" 345, and "Blue" 350. The "Dominant Color Selection" field shows the RGB values in data fields 342, 347, and 352, respectively. In the example embodiment of FIG. 3, "Red" is the dominant color having the value "165" in data field 347, meaning that the Red component for every pixel in the slice is the same, which in this example is "165". The "Green" and "Blue" values in data fields 342 and 352, respectively, are "211" and "88". Since "Red" is the dominant color in the present example with a value of "165," the 2-D color palette 305 shows "Blue" values [0, 255] in the X-axis, and "Green" values [0,255] in the Y-axis. This example is illustratively only, and is not intended to be limiting in any manner.

The color having RGB values (165, 211, 88) is indicated in rendering 315 of the 3-D color space by marker 325, and in the 2-D palette 305 by marker 310. In addition, color bar 355 shows the color corresponding to the RGB values and the markers 325 and 310, and sliding marker 360 is moved along the length of color bar 355 to increase or decrease the brightness of the current color.

Further still, UI 205 may include data field 330 to show the selected color as it would be displayed in the authoring environment and data field 335 to show the selected color as it would be displayed in the destination environment. In order to simulate the selected color in the destination environment, gamma-corrected RGB values in the destination color space are calculated, and the resulting values may be shown in data field 335.

Data field 335 may, alternatively, provide an indication of the validity or invalidity of the selected color in the destination environment, or it may show the user a "next closest" color selection that would be valid in the destination environment. A "next closest" color selection may include a minimum average RGB value or a projection of the invalid color onto the valid color space designed to minimize a perceptual color difference.

Any of the combined RGB values in data fields 342, 347, 352; and markers 310, 325, and 355 can be controlling of the others. That is, the user can either enter RGB values or maneuver a cursor to control the markers corresponding to color palette 305, color space rendering 315, or even color bar 355 to select a color for an application currently being designed or programmed.

Figure 4:
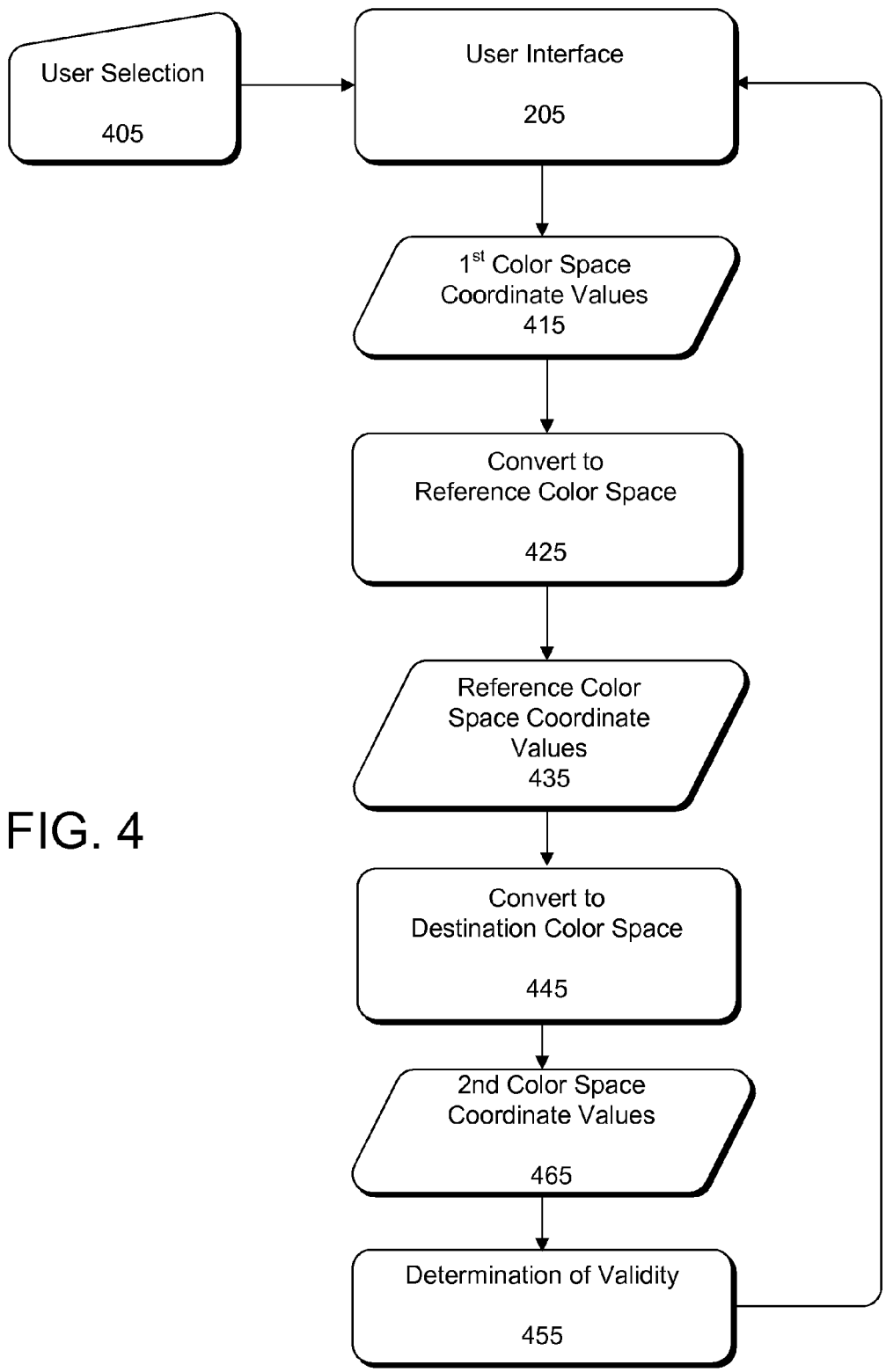
FIG. 4 illustrates the processing in accordance with the example embodiment of FIG. 2.

As shown in FIG. 4, the user's selection 405 of a color in the design and/or programming of an application is detected or received at UI 205. The coordinate values 415 of the selected color, corresponding to the authoring environment color space, are converted 425 to coordinate values 435 in a reference color space. As indicated above, the reference color space, which may also be referred to as a fundamental color space, is typically a color space that has been standardized by the color standards body IEC. An example of such fundamental color space is CIE XYZ (Commission Internationale de l'Eclairage). CIE XYZ is a color model defined in 1931 that represents all possible colors in a 2-D chromaticity diagram. CIE has a large color gamut and is considered to be a reliable color model that is optimal for use as a reference or an intermediary for color space conversion. An algorithmic conversion of coordinate values 415 in the first color space to coordinate values 435 in the reference/fundamental color space is described further below with reference to FIG. 5.

The coordinate values 435 in the reference/fundamental color space are converted 445 to coordinate values 465 in a color space for a destination environment. A determination of validity or invalidity 455 of the color for the destination environment is made in accordance with at least one predetermined criteria, and the user may be so informed via UI 205. An algorithmic conversion of the coordinate values 435 in the reference color space to coordinate values 465 in the color space for the destination environment is described further below with reference to FIG. 6.

Figure 5:
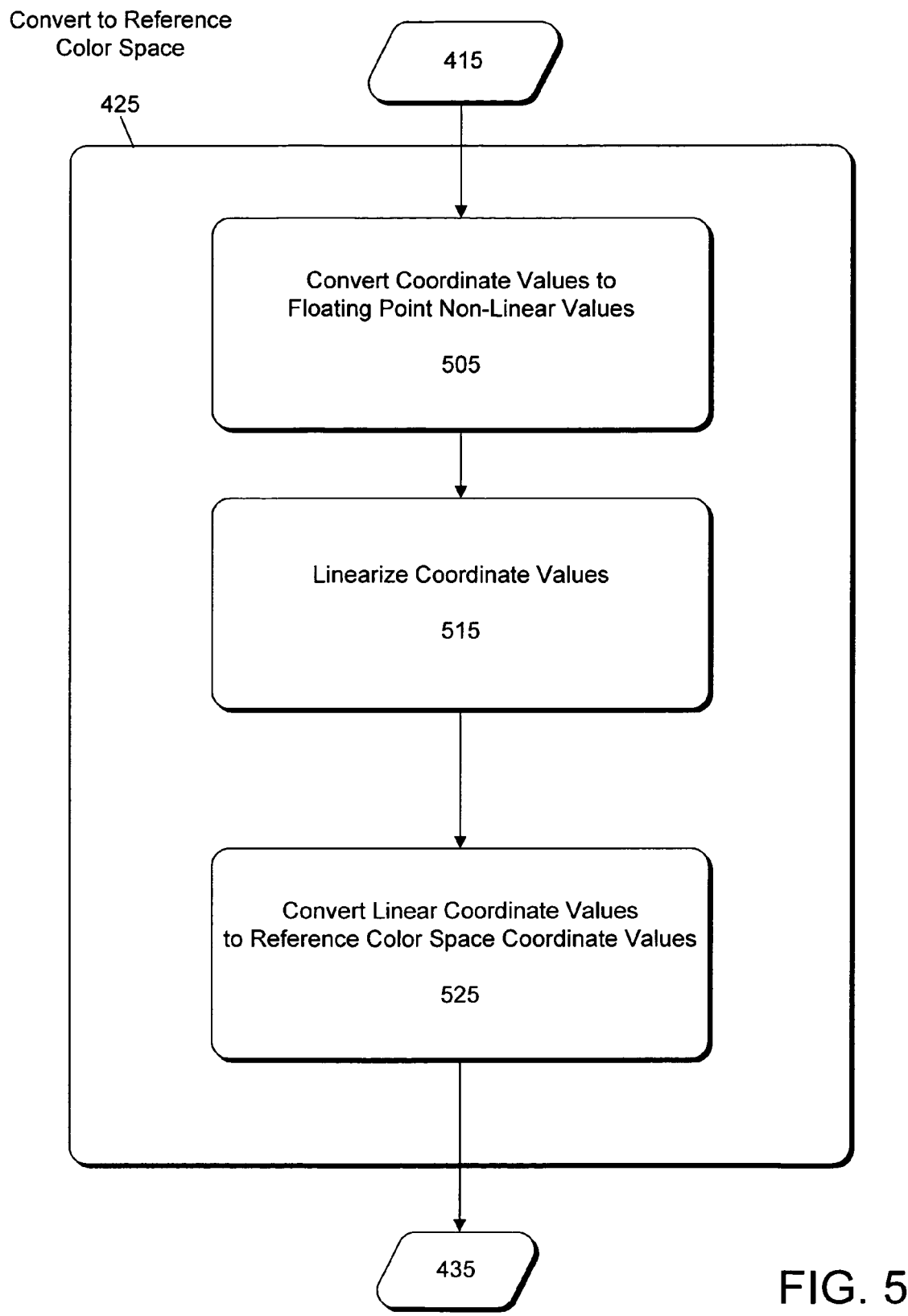
FIG. 5 illustrates processing further to the example embodiment of FIG. 4.

Further to the example of FIG. 4, FIG. 5 provides an example of converting 425 coordinate values 415 corresponding to a first color space to coordinate values 435 corresponding to a reference color space. In accordance with the example embodiment, although content source 100 of the authoring environment references an RGB/sRGB color space with 8 bits-per-channel (bpc) encoding, i.e., 8 bits being dedicated to each of RGB, it is known in the art that various TV or STB platform applications use 5 or 6 bpc, and that advanced applications utilize 10, 12, 16, or 32 bpc. Using the example embodiments described herein, the transformation of color values from a first environment to a destination environment can be made regardless of any variance in bpc for the respective color spaces, as described further below.

Coordinate values 415 are normalized in accordance with the number of bits-per-channel corresponding to color space of the authoring environment. The example of FIG. 5 shows, using an 8-bit RGB/sRGB color space at the authoring environment, coordinate values 415 are to be normalized by converting 505 the RGB/sRGB values to floating point non-linear sR'G'B' values as follows:

$R'_{sRGB}=R_{8bit}/255.0$ $G'_{sRGB}=G_{8bit}/255.0$ $B'_{sRGB}=B_{8bit}/255.0$ More specifically, the individual R, G, and B component values are divided by $2^x$, where x equals the bpc value for the authoring environment color space. Therefore, the transforms described herein can be modified to accommodate whatever bpc value corresponds to the color space of the authoring environment.

Using standardized transformations and values, the non-linear R'G'B'/sR'G'B' values are linearized 515, i.e., transformed to linear R, G, B values as follows:

If $R'_{sRGB}, G'_{sRGB}, B'_{sRGB} \leq 0.04045$ $R'_{sRGB}=R_{8bit}/12.92$ $G'_{sRGB}=G_{8bit}/12.92$ $B'_{sRGB}=B_{8bit}/12.92$ else if $R'_{sRGB}, G'_{sRGB}, B'_{sRGB} > 0.04045$ $R=((R'_{sRGB}+0.055)/1.055)^{2.4}$ $G=((G'_{sRGB}+0.055)/1.055)^{2.4}$ $B=((B'_{sRGB}+0.055)/1.055)^{2.4}$ Such linearization is also referred to as "gamma-correction" and is designed to account for the non-linear transformation that a display monitor introduces to its input R, G, B primary values. The resulting gamma corrected RGB/sRGB values are within the range of [0,1].

In alternative embodiments, the designer of the application for the destination environment may want to adjust the resulting colors in the destination environment for various lighting conditions. Accordingly, standardized corrections to the above gamma correction may be made.

The linearized component values corresponding to the color selected by the user are converted 525 to a reference color system, also referred to as a fundamental color coordinate system. As discussed above, CIE XYZ is considered a most reliable color model, and may be optimal for use as a reference or an intermediary for color space conversion. RGB/sRGB values can be transformed to CIE XYZ by a three-by-three matrix transform known in the art. The transform involves tristimulus values, which are sets of three linear-light components that conform to CIE color matching functions. Thus, in accordance with standardized conversions, the linearized component values are converted 525 to reference color space component values as follows:

$$\begin{bmatrix} x \\ y \\ z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}$$

Figure 6:
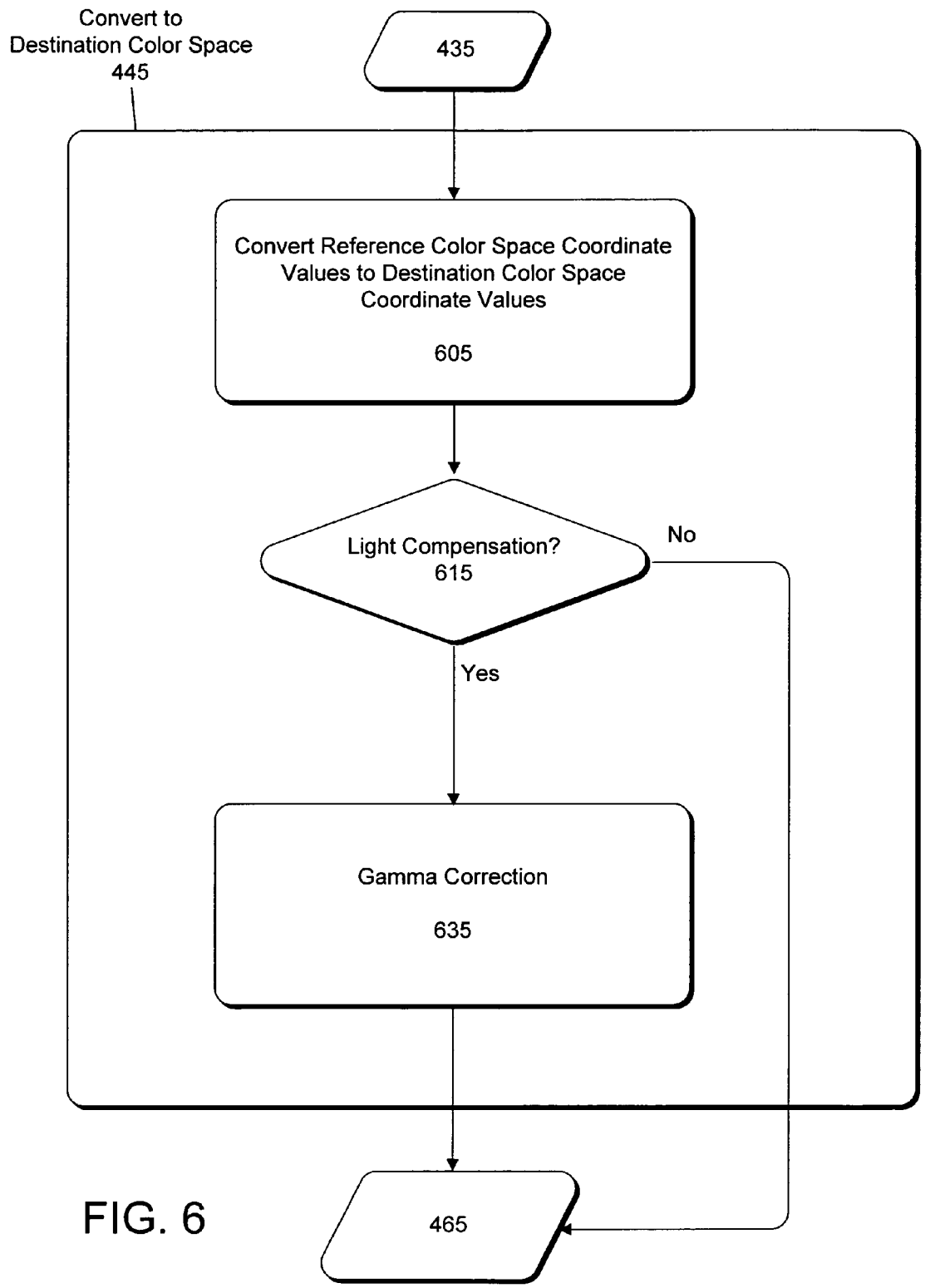
FIG. 6 illustrates processing further to the example embodiment of FIG. 4.

As shown in FIG. 6, the resulting reference color space component values 435 are converted 445 to the color space coordinate values 465 corresponding to the destination environment. In particular, for the present example embodiment, tri-stimulus values 435 are converted 605 to the YIQ color space, which is the NTSC receiver primary color coordinate system, using the following known transform:

$$\begin{bmatrix} r_N \\ g_N \\ b_N \end{bmatrix} = \begin{bmatrix} 1.910 & -0.533 & -0.288 \\ -0.985 & 2.000 & -0.028 \\ 0.058 & -0.118 & 0.896 \end{bmatrix} \begin{bmatrix} x \\ y \\ z \end{bmatrix}$$

The resulting $r_N$, $g_N$, and $b_N$ values are the values 465 for the selected color in the color space corresponding to the destination environment.

Referring back to FIG. 4, a determination 455 is made as to whether the converted values 465 are valid for the destination environment. More specifically, in accordance with the example embodiments described herein, the converted values 465 are determined to be "TV-safe", or valid for a TV receiving environment, if each of the resulting $r_N$, $g_N$, and $b_N$ values are within the range of [0,1].

If the color is determined to be TV-safe, the appearance of the selected color in the destination environment, particularly in a YIQ color space TV in the present example, may be simulated by calculating gamma-corrected red, green, and blue values using the following known transform:

$$\begin{bmatrix} r_N \\ g_N \\ b_N \end{bmatrix}_\gamma = \begin{cases} 4.5 \begin{bmatrix} r_N \\ g_N \\ b_N \end{bmatrix} & \text{for } r_N, g_N, b_N < 0.018 \\ 1.099 \begin{bmatrix} r_N^{0.45} \\ g_N^{0.45} \\ b_N^{0.45} \end{bmatrix} - 0.099 & \text{for } r_N, g_N, b_N \geq 0.018 \end{cases}$$

Furthermore, as mentioned above, alternative embodiments may include the designer of the application for the destination environment adjusting the resulting colors in the destination environment for various lighting conditions 615. Accordingly, corrections 635 to the above gamma-corrections, known in the art, may be made using known techniques. However, regardless of whether or not such corrections are made, a color corresponding to the above rN, gN, and bN may be shown to the user, via the UI.

In the alternative, if the color is found to be in-valid, or not to be TV-safe, the UI may present the user with a "next closest" color selection that is TV-safe. Such a "next closest" color selection may include a minimum average RGB vale, or a projection onto the TV-safe color space according to a direction designed to minimize a perceptual color difference.

Figure 7:
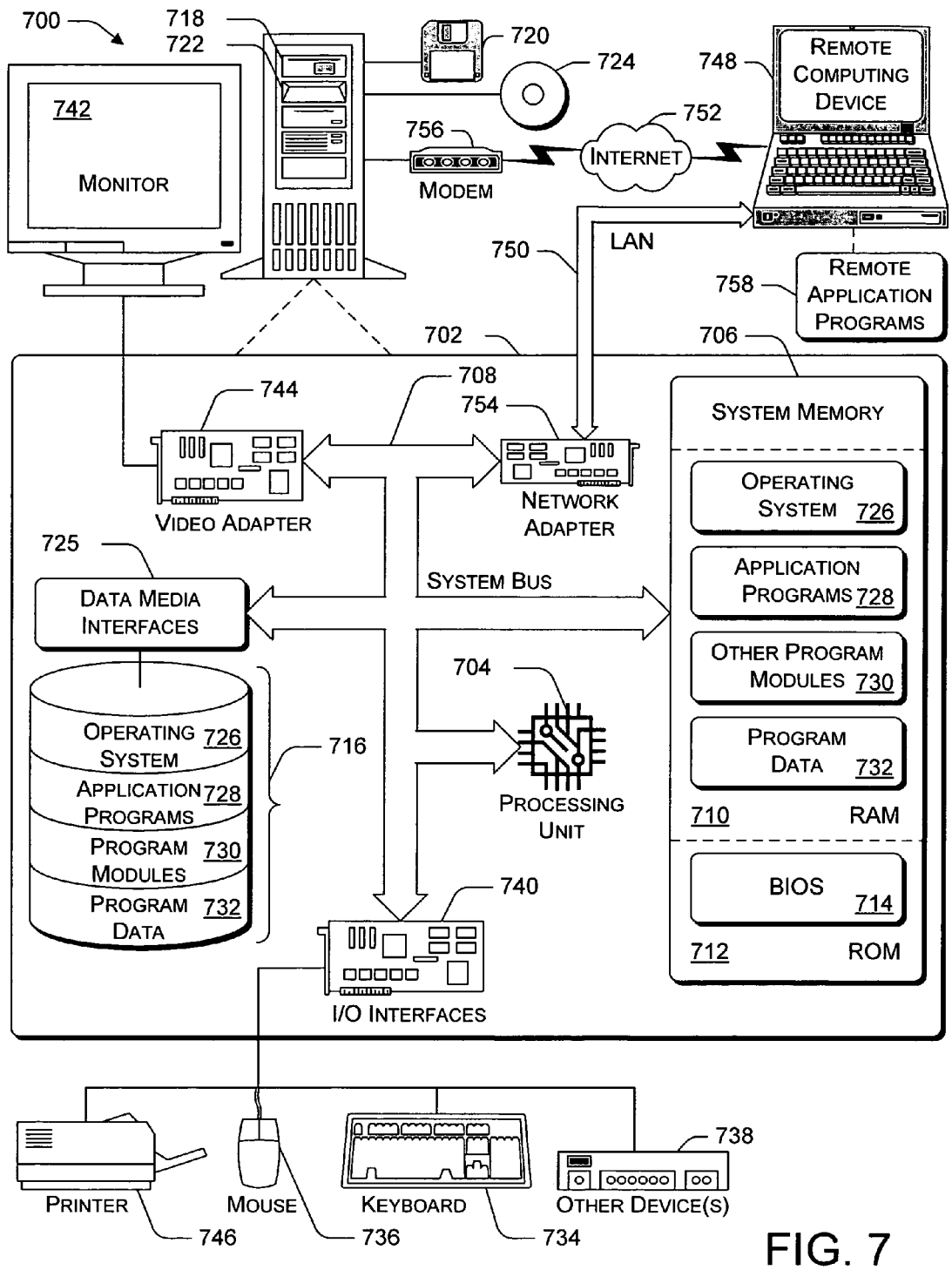
FIG. 7 illustrates a general computer environment which can be used to implement the techniques described herein.

FIG. 7 illustrates a general computer environment 700, which can be used to implement the techniques described herein. Computer environment 700 is only one example of a computing environment and is not intended to suggest any limitation as to the scope of use or functionality of the computer and network architectures. Neither should computer environment 700 be interpreted as having any dependency or requirement relating to any one or combination of components illustrated in the example computer environment 700.

Computer environment 700, corresponding to content source 100 in FIG. 1, includes a general-purpose computing device in the form of computer 702, having an RGB/sRGB color space monitor, for designing and programming STB platform applications for destination television environments. The components of computer 702 can include, but are not limited to, one or more processors or processing units 704, system memory 706, and system bus 708 that couples various system components including processor 704 to system memory 706.

System bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 702 may include a variety of computer readable media. Such media can be any available media that is accessible by computer 702 and includes both volatile and non-volatile media, removable and non-removable media.

System memory 706 includes computer readable media in the form of volatile memory, such as random access memory (RAM) 710; and/or non-volatile memory, such as read only memory (ROM) 712 or flash RAM. Basic input/output system (BIOS) 714, containing the basic routines that help to transfer information between elements within computer 702, such as during start-up, is stored in ROM 712 or flash RAM. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 includes hard disk drive 716 for reading from and writing to a non-removable, non-volatile magnetic media (not shown), magnetic disk drive 718 for reading from and writing to removable, non-volatile magnetic disk 720 (e.g., a "floppy disk"), and optical disk drive 722 for reading from and/or writing to removable, non-volatile optical disk 724 such as a CD-ROM, DVD-ROM, or other optical media. Hard disk drive 716, magnetic disk drive 718, and optical disk drive 722 are each connected to the system bus 708 by one or more data media interfaces 725. Alternatively, hard disk drive 716, magnetic disk drive 718, and optical disk drive 722 can be connected to system bus 708 by one or more interfaces (not shown).

The disk drives and their associated computer-readable media provide non-volatile storage of computer readable instructions, data structures, program modules, and other data for computer 702. Although the example illustrates hard disk 716, removable magnetic disk 720, and removable optical disk 724, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 716, magnetic disk 720, optical disk 724, ROM 712, and/or RAM 710, including by way of example, operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information, particularly the selection of colors via UI 205 (see FIG. 1), into computer 702 by using input devices such as keyboard 734, but more likely pointing device 736 (e.g., a "mouse"). Other input devices 738 (not shown specifically) may include a microphone (for voice activated input), joystick, game pad, satellite dish, serial port, scanner, and/or the like. These and other input devices are connected to processing unit 704 via input/output interfaces 740 that are coupled to system bus 708, but may be connected by other interface and bus structures, such as a parallel port, game port, or a universal serial bus (USB).

Monitor 742 or other type of display device can also be connected to the system bus 708 via an interface, such as a video adapter 744. In addition to monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, remote computing device 748 can be a PC, portable computer, a server, a router, a network computer, a peer device or other common network node, and the like. Remote computing device 748 is illustrated as a portable computer that can include many or all of the elements and features described herein relative to computer 702. Alternatively, computer 702 can operate in a non-networked environment as well.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, computer 702 is connected to local network 750 via a network interface or adapter 754. When implemented in a WAN networking environment, computer 702 typically includes modem 756 or other means for establishing communications over wide network 752. Modem 756, which can be internal or external to computer 702, can be connected to the system bus 708 via input/output interfaces 740 or other appropriate mechanisms. It is appreciated that the illustrated network connections are examples and that other means of establishing at least one communication link between computers 702 and 748 can be employed.

In a networked environment, such as that illustrated with computing environment 700, program modules depicted relative to computer 702, or portions thereof, may be stored in a remote memory storage device. By way of example, remote application programs 758 reside on a memory device of remote computer 748. For purposes of illustration, applications or programs and other executable program components such as the operating system are illustrated herein as discrete blocks, although it is recognized that such programs and components reside at various times in different storage components of the computing device 702, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method of validating a color in a media environment, the method comprising:
   receiving a selection of a color for video content authored in a first color space corresponding to a computing environment used to author video content;
   mapping component values of the selected color to corresponding color component values in a reference color space;
   converting the color component values in the reference color space to corresponding color component values in a second color space corresponding to a display device to display the video content in a television environment;
   determining the validity of the color component values in the second color space according to an established parameter;
   when the color component values are determined to be invalid, suggesting a valid color as an alternative to the selected color; and
   when the color component values are determined to be valid:
      simulating in the computing environment the visual appearance of the selected color in the television environment using gamma corrected values calculated from the color component values in the second color space; and including the selected color in a video application having the video content for output on the display device which uses the second color space.

2. A method according to claim 1, wherein the first color space is a sRGB color space.

3. A method according to claim 1, wherein the first color space is an RGB color space.

4. A method according to claim 1, wherein the second color space is an NTSC color space.

5. A method according to claim 1, wherein the second color space is a PAL color space.

6. A method according to claim 1, wherein the second color space is a SECAM color space.

7. A method according to claim 1, wherein the first color space is valid for a computer monitor.

8. A method according to claim 1, wherein the display device is a television monitor.

9. A method according to claim 1, wherein the display device is a video monitor.

10. A method according to claim 9, wherein the video monitor includes a special purpose video display having a color gamut different than a television monitor.

11. A method according to claim 1, wherein the first color space is one of a NTSC color space, a PAL color space, and a SECAM color space, and the second color space is either one of an sRGB color space and an RGB color space.

12. A method according to claim 1, wherein the reference color space includes a CIE XYZ color space.

13. A method according to claim 1, wherein the reference color space is standardized by the International Electrotechnical Commission (IEC).

14. A method according to claim 1, wherein the established parameter includes color component values each within a range of [0,1].

15. A method according to claim 1, wherein choosing a color in a first color space includes normalizing the component values of the chosen color in accordance with the number of bits-per-channel in the first color space.

16. A method according to claim 1, wherein converting the color component values in the reference color space includes converting the color component values in the reference color space to corresponding color component values in a normalized TV color space.

17. A method according to claim 1, further comprising:
responsive to suggesting the valid color as an alternative to the selected color, receiving a selection of the alternative color; and
including the alternative color in the video application having the video content for output on the display device which uses the second color space.

18. An apparatus comprising:
a processor;
a memory coupled to the processor; and
a module stored in the memory and executable on the processor to perform acts comprising:
receiving a selection of a color for video content authored in a first color space corresponding to a computing environment used to author video content;
mapping component values of the selected color to corresponding color component values in a reference color space;
converting the color component values in the reference color space to corresponding color component values in a second color space corresponding to a display device to display the video content in a television environment
determining the validity of the color component values in the second color space according to an established parameter;
when the color component values are determined to be invalid,
suggesting a valid color as an alternative to the selected color; and
when the color component values are determined to be valid:
displaying the selected color in a user interface in the computing environment as it would appear in the television environment using gamma corrected values corresponding to the color component values; and
including the selected color in a video application having the video content for output on the display device which uses the second color space.

19. One or more computer-readable storage media storing instructions executable on a processor to perform acts comprising:
receiving a selection of a color for video content authored in a first color space corresponding to a computing environment used to author the video content;
mapping component values of the selected color to corresponding color component values in a reference color space;
converting the color component values in the reference color space to corresponding color component values in a second color space corresponding to a display device to display the video content in a television environment
determining the validity of the color component values in the second color space according to an established parameter;
when the color component values are determined to be invalid,
suggesting a valid color as an alternative to the selected color; and
when the color component values are determined to be valid:
displaying the selected color in a user interface in the computing environment as it would appear in the television environment using gamma corrected values corresponding to the color component values; and
including the selected color in a video application having the video content for output on the display device which uses the second color space.

* * * * *